(12) United States Patent
King

(10) Patent No.: US 10,862,284 B2
(45) Date of Patent: Dec. 8, 2020

(54) WIRE CLEARANCE APPARATUS AND METHOD

(71) Applicant: Warren Stanley King, Reedville, VA (US)

(72) Inventor: Warren Stanley King, Reedville, VA (US)

( * ) Notice: Subject to any disclaimer, the term of this patent is extended or adjusted under 35 U.S.C. 154(b) by 14 days.

(21) Appl. No.: 16/503,744

(22) Filed: Jul. 5, 2019

(65) Prior Publication Data

US 2019/0334329 A1    Oct. 31, 2019

Related U.S. Application Data

(62) Division of application No. 15/460,416, filed on Mar. 16, 2017, now abandoned.

(60) Provisional application No. 62/319,087, filed on Apr. 6, 2016.

(51) Int. Cl.
*H02G 3/04* (2006.01)
*H02G 3/32* (2006.01)

(52) U.S. Cl.
CPC ............. *H02G 3/0456* (2013.01); *H02G 3/32* (2013.01)

(58) Field of Classification Search
CPC .......... H02G 3/0456; H02G 3/32; H02G 3/30; F16L 3/23; F16L 3/22; F16L 3/24
USPC ............... 29/559; 248/69, 68.1, 49; 361/826
See application file for complete search history.

(56) References Cited

U.S. PATENT DOCUMENTS

| | | | | |
|---|---|---|---|---|
| 6,327,139 B1 * | 12/2001 | Champion | ............. | H02B 1/202 174/69 |
| D464,559 S * | 10/2002 | Bjorklund | ...................... | D8/356 |
| 6,494,411 B1 * | 12/2002 | Bjorklund | ................ | H02G 3/30 248/228.6 |
| 6,708,830 B2 * | 3/2004 | Mendoza | ............... | H04Q 1/064 211/169 |
| 6,946,605 B2 * | 9/2005 | Levesque | ............. | H02G 3/0493 174/100 |
| 7,588,216 B1 * | 9/2009 | Hoyl | ........................ | H02G 3/30 174/50 |
| 7,674,138 B2 * | 3/2010 | Mori | ........................ | H02G 3/32 439/701 |
| 8,363,998 B2 * | 1/2013 | Newman | ................ | H04Q 1/062 385/135 |
| 8,840,071 B2 * | 9/2014 | Oh | ........................... | H02G 3/32 248/68.1 |
| 9,913,397 B2 * | 3/2018 | Miwa | ................... | H02G 3/0406 |

\* cited by examiner

*Primary Examiner* — Lee D Wilson
*Assistant Examiner* — Seahee Hong

(57) ABSTRACT

A wire clearance apparatus is provided. The wire clearance apparatus includes a body. The body includes a clamp operable to releasably attach the body to a flange or rim of a panel housing. A pivoting member extends laterally from the body. The pivoting member includes a pivoting arm including a proximal end and a distal end. The proximal end of the pivoting arm is connected to the body. The pivoting arm is operable to pivot about a longitudinal axis of the body. The distal end of the pivoting arm includes a hook.

4 Claims, 4 Drawing Sheets

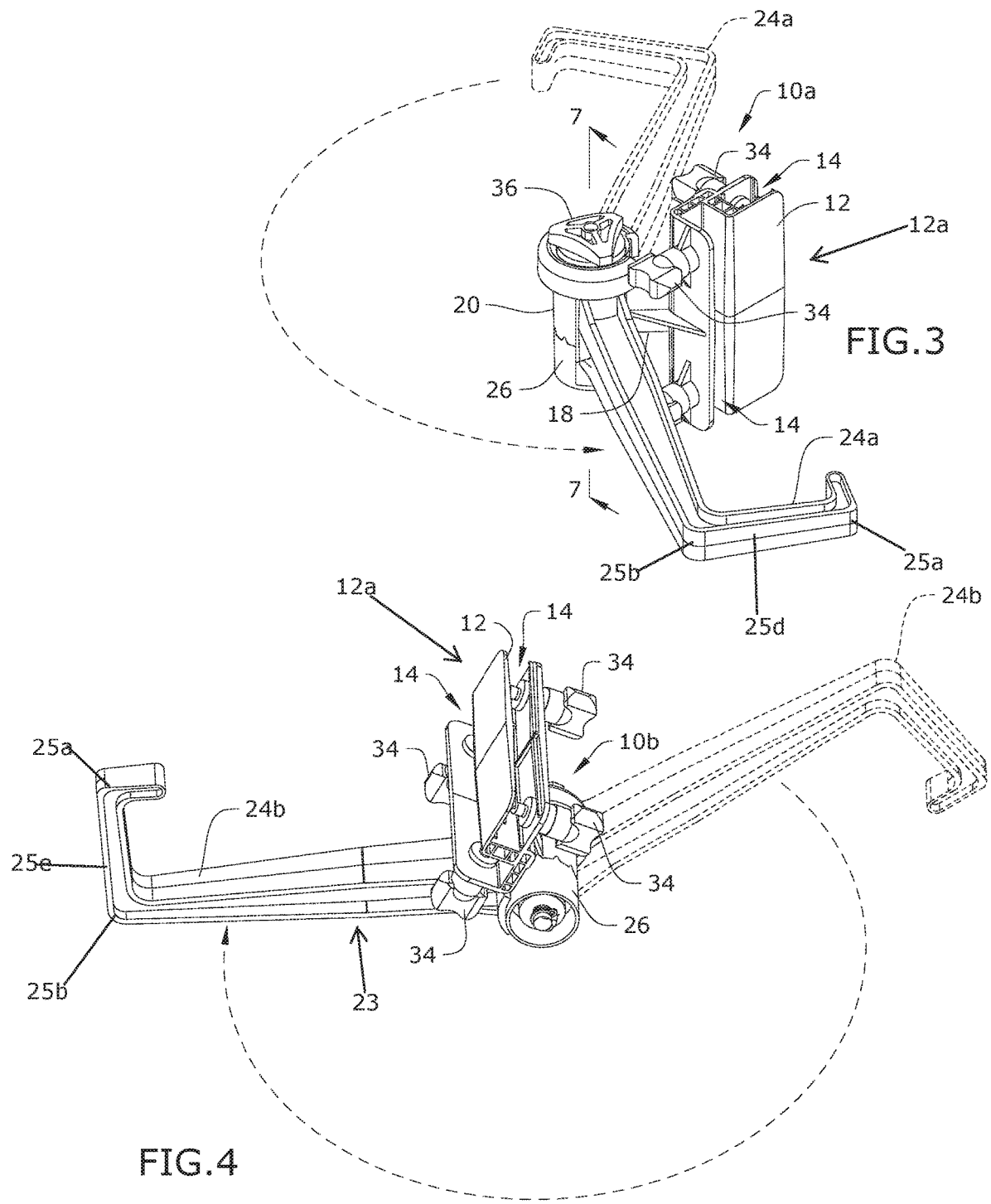

WIRE CLEARANCE APPARATUS AND METHOD

CROSS-REFERENCE TO RELATED APPLICATION

This application is a divisional application of U.S. nonprovisional application Ser. No. 15/460,416, filed Mar. 16, 2017 which claims the benefit of priority of U.S. provisional application No. 62/319,087, filed Apr. 6, 2016, the contents of which are herein incorporated by reference.

BACKGROUND OF THE INVENTION

The present invention relates to clearance of wires and, more particularly, to a wire clearance apparatus and method.

During the installation of new services and upgrades within a panel or switch gear, wires are hanging in front of the bus bars and service entrance wires. The hanging wires create a dangerous work area and make it difficult to access the neutral or ground bars. Leaving a clutter of wires hanging freely in the work area may result in wires being pushed or bumped into the energized bus bars, and main wires which could result in an explosion. The current method of securing the wires out of the work area includes tying the wires together, using plastic zip-ties or using tape.

As can be seen, there is a need for an improved method of moving wires away from energized parts of a panel or switch gear and the work area of telecommunication enclosures.

SUMMARY OF THE INVENTION

In one aspect of the present invention, a wire clearance apparatus comprises: a body comprising a clamp operable to releasably attach the body to a panel housing; and a pivoting member extending laterally from the body, wherein the pivoting member comprises a pivoting arm comprising a proximal end and a distal end, wherein the proximal end is connected to the body and operable to pivot about a longitudinal axis of the body, and the distal end comprises a hook formed by at least one bend.

In another aspect of the present invention, a method of clearing wires comprises the steps of: clamping a first wire clearance apparatus to a first side flange of a panel housing, wherein the first wire clearance apparatus comprises a first pivoting arm comprising a first hook portion; clamping a second wire clearance apparatus to a second side flange of the panel housing opposite the first side flange, wherein the second wire clearance apparatus comprises a second pivoting arm comprising a second hook portion; placing a left set of wires into the left hook portion; placing a right set of wires into the right hook portion; after removing an outer jacket from wire, rotating the first pivoting arm away from the panel housing, thereby clearing the first set of wires from an internal portion of the panel housing; and rotating the second pivoting arm away from the panel housing, thereby clearing the second set of wires from the internal portion of the panel housing.

These and other features, aspects and advantages of the present invention will become better understood with reference to the following drawings, description and claims.

BRIEF DESCRIPTION OF THE DRAWINGS

FIG. 3 is a top perspective view of an embodiment of the present invention;

FIG. 4 is a bottom perspective view of an embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a wire clearance apparatus. The wire clearance apparatus ensures that wires are kept away and clear from electrically energized parts in an electrical panel or switch gear. The present invention holds the wires away from the work area in an orderly manner until the electrician is ready to connect them one at a time, thus, leaving the entire work space in the panel or switch gear open and free for easy and safe accessibility. The present invention prevents electrical shorts or other accidents from occurring and helps to organize telecommunication wires while being installed.

Figure 1:
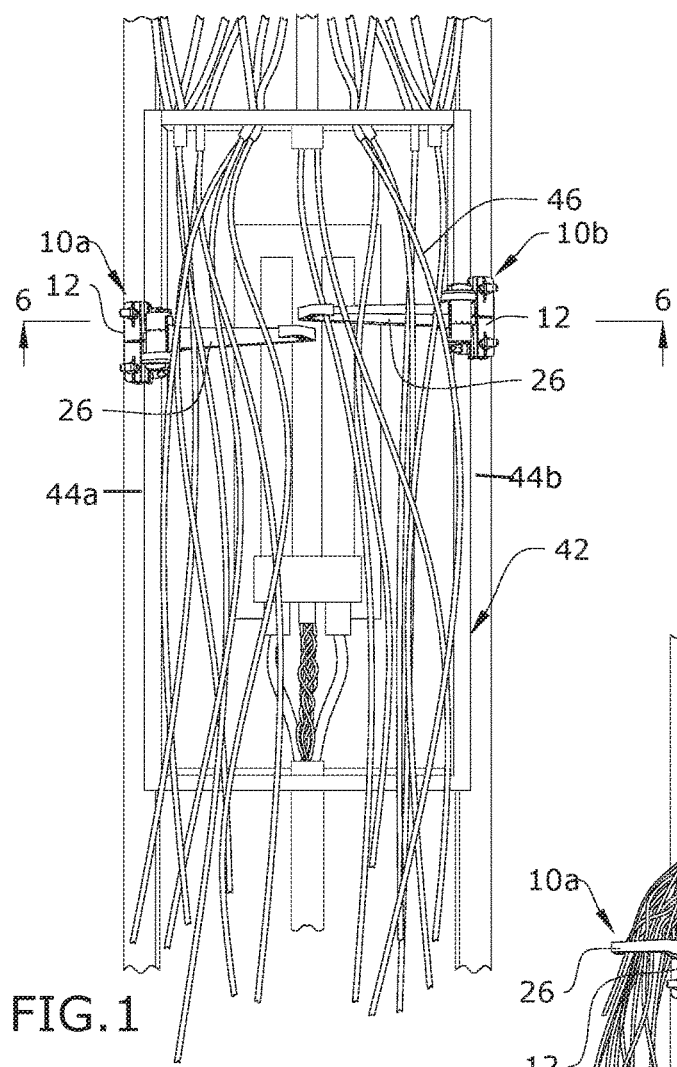
FIG. 1 is a perspective view of an embodiment of the present invention in use.
Figure 2:
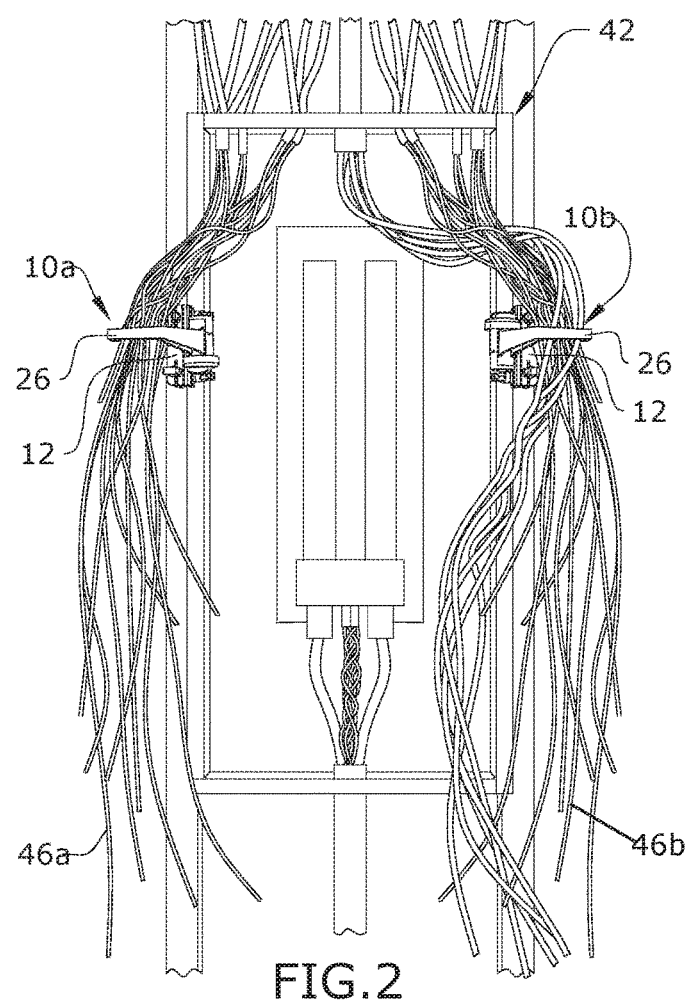
FIG. 2 is a perspective view of an embodiment of the present invention shown in use.
Figure 5:
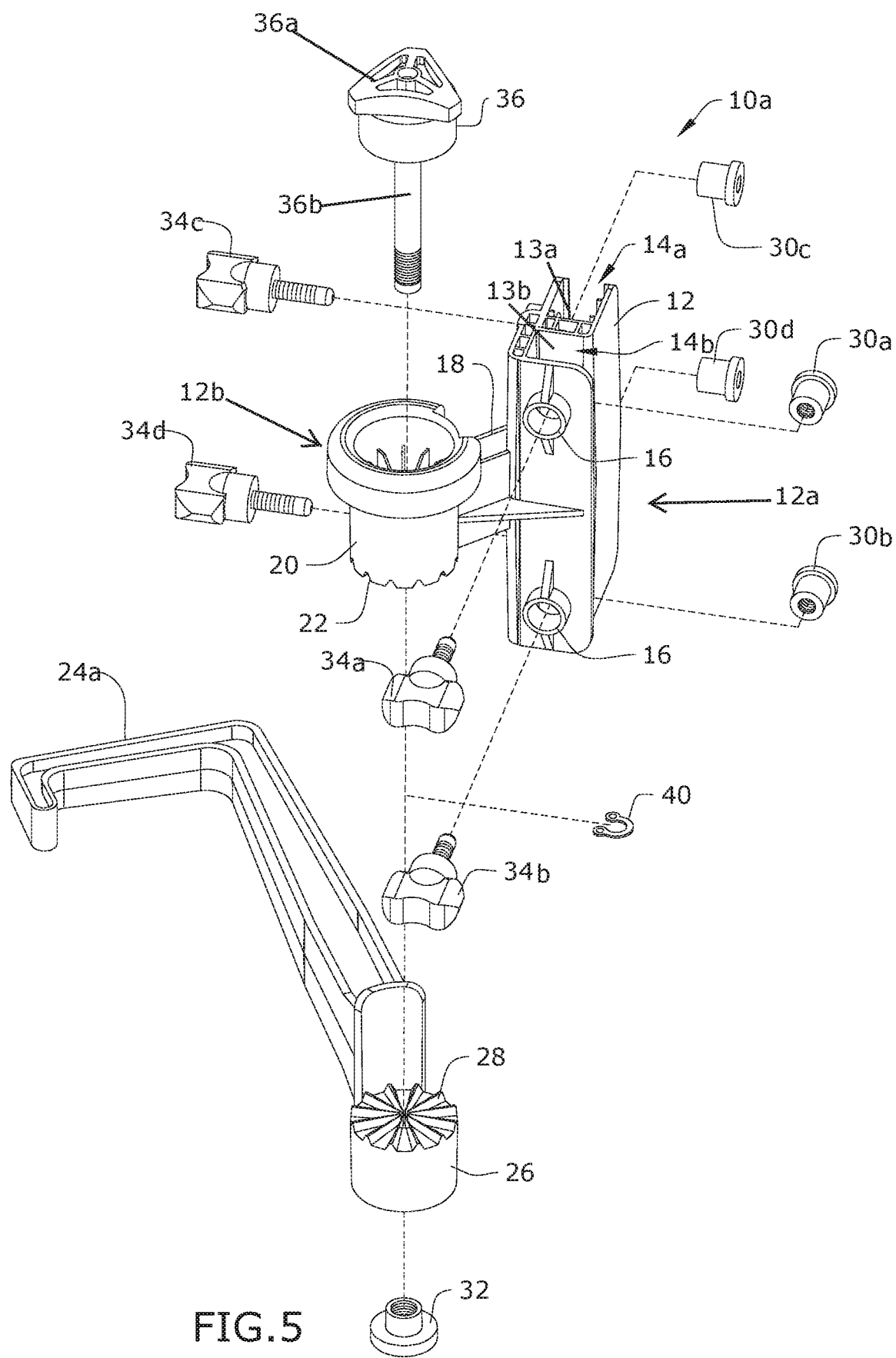
FIG. 5 is an exploded view of an embodiment of the present invention.
Figure 6:
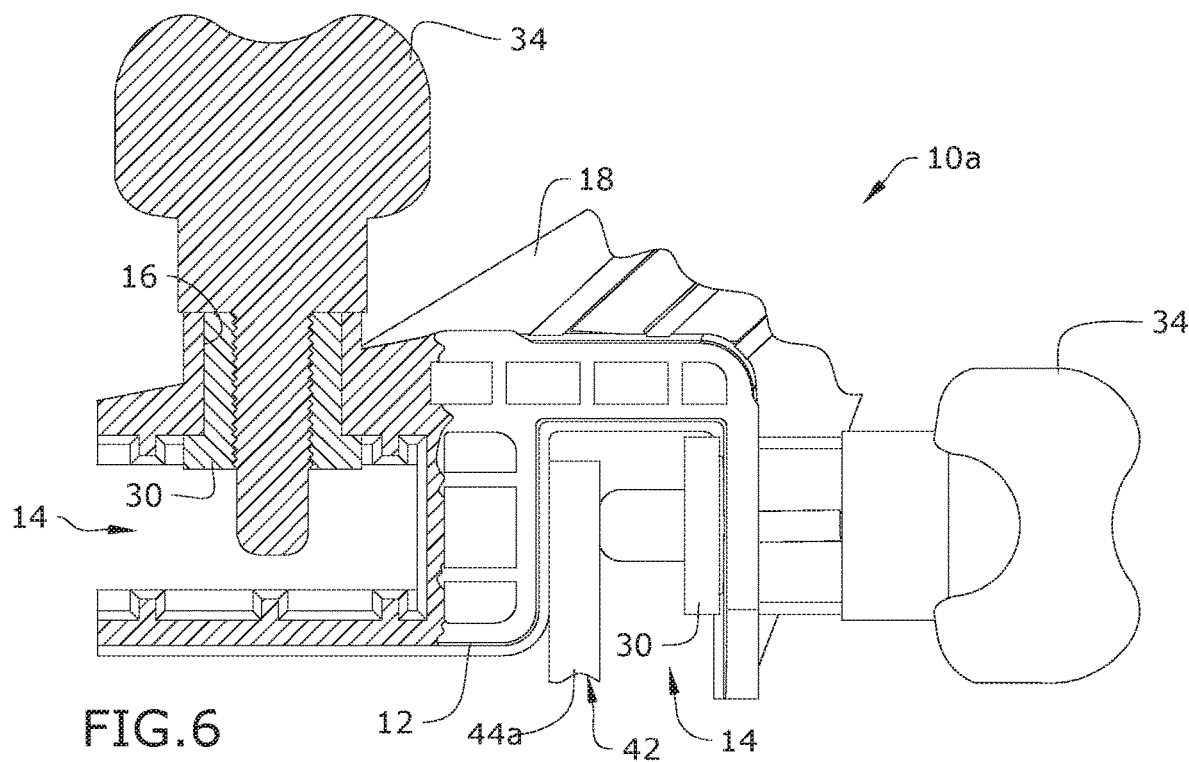
FIG. 6 is a section detail view of the present invention taken along line 6-6 in FIG. 1.
Figure 7:
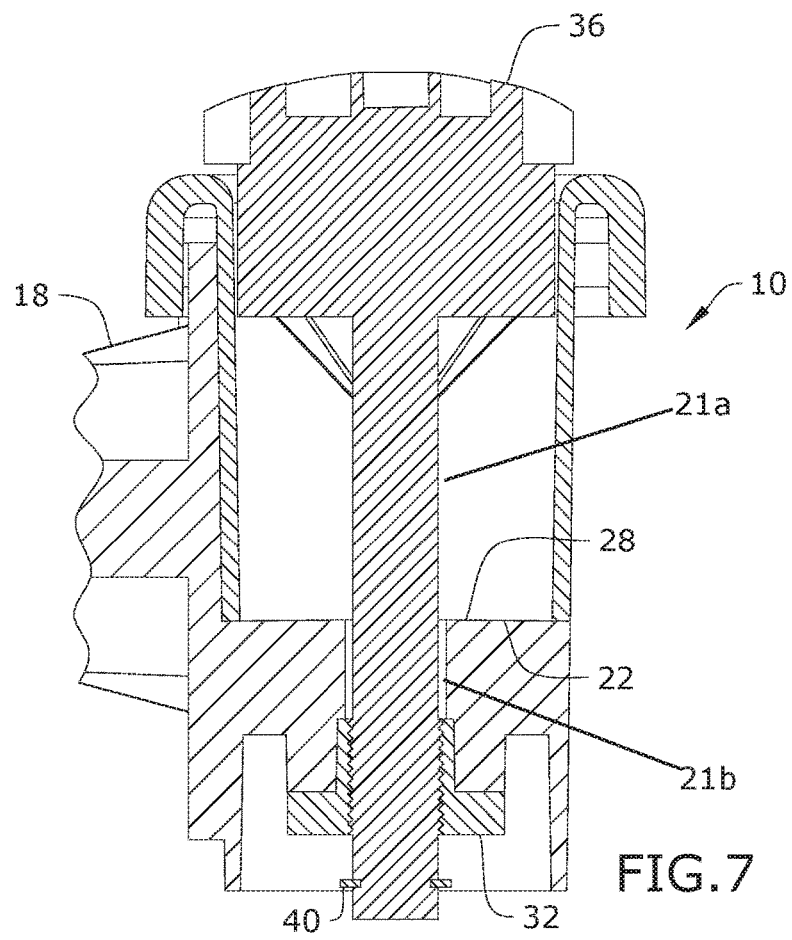
FIG. 7 is a section detail view of the present invention taken along line 7-7 in FIG. 3.

Referring to FIGS. 1 through 7, the present invention includes a wire clearance apparatus 10*a*, 10*b*. The wire clearance apparatus 10*a*, 10*b* includes a body 12. The body 12 includes a clamp 12*a* operable to releasably attach the body 12 to a flange 44 or rim of a panel housing 42. A pivoting member 23 extends laterally from the body 12. The pivoting member 23 includes a pivoting arm 24*a*, 24*b* including a proximal end and a distal end. The proximal end of the pivoting arm 24*a*, 24*b* is connected to the body 12. The pivoting arm 24*a*, 24*b* is operable to pivot about a longitudinal axis of the body 12. The distal end of the pivoting arm 24*a*, 24*b* includes a hook portion 25*d*, 25*e* formed by a first bend 25*a* and a second bend 25*b* forming a U-shape.

The clamp 12*a* of the present invention may include a first pair of panels 13*a* and a second pair of panels 13*b*. The first pair of panels 13*a* are vertically disposed and form a first slot 14*a* therebetween. The second pair of panels 13*b* are vertically disposed and form a second slot 14*b* therebetween. The first slot 14*a* and the second slot 14*b* are perpendicular relative to one another. This allows the present invention to be clamped to different types of panel housings 42.

One of the first pair of panels 13*a* includes an upper first slot 16 and a lower first slot 16. An upper first threaded grommet 30*a* having a threaded female opening is fixedly secured within the upper first slot 16 and a lower first threaded grommet 30*b* having a threaded female opening is fixedly secured within the lower first slot 16. The present invention further includes an upper first thumb screw 34*a* and a lower first thumb screw 34*b*. The upper first thumb screw 34*a* and the lower first thumb screw 34*b* each include a knob and a threaded shaft. The threaded shaft of the upper first thumb screw 34*a* is rotatably disposed within the upper first threaded grommet 30a. The threaded shaft of the lower first thumb screw 34b is rotatably disposed within the lower first threaded grommet 30b. To secure the body 12 to the flange 44, the flange 44 is placed within the first slot 14a. The knob of both of the upper first thumb screw 34a and the lower first thumb screw 34b are rotated so that the threaded shafts apply pressure against the flange 44 and secure the body 12 to the panel housing 42.

One of the second pair of panels 13b includes an upper second slot 16 and a lower second slot 16. An upper second threaded grommet 30c having a threaded female opening is fixedly secured within the upper second slot 16 and a lower second threaded grommet 30d having a threaded female opening is fixedly secured within the lower second slot 16. The present invention further includes an upper second thumb screw 34c and a lower second thumb screw 34d. The upper second thumb screw 34c and the lower second thumb screw 34d each include a knob and a threaded shaft. The threaded shaft of the upper second thumb screw 34c is rotatably disposed within the upper second threaded grommet 30c. The threaded shaft of the lower second thumb screw 34d is rotatably disposed within the lower second threaded grommet 30d. To secure the body 12 to the flange 44, the flange 44 is placed within the second slot 14b. The knob of both of the upper second thumb screw 34c and the lower second thumb screw 34d are rotated so that the threaded shafts apply pressure against the flange 44 and secure the body 12 to the panel housing 42.

The body 12 of the present invention may further include a connector portion 12b connected to the pivoting member 23. The connector portion 12b includes a body arm 18 extending laterally from the clamp 12a. A body shaft 20 is fixedly secured to the body arm 18. The body shaft 20 includes a top portion and a bottom portion. The bottom portion includes a bottom surface having a plurality of radially spaced teeth 22. A first channel 21a is disposed along a longitudinal axis of the body shaft 20 running from the top portion to the bottom portion.

The pivoting member 23 includes an arm shaft 26 and the pivoting arm 24a, 24b. The arm shaft 26 includes a top portion and a bottom portion. The top portion includes a top surface having a plurality of radially spaced teeth 28. A second channel 21b is disposed along a longitudinal axis of the arm shaft 26 and runs from the top portion to the bottom portion of the arm shaft 26. A threaded insert 32 is fixedly secured within the second channel 21b at the bottom portion. The pivoting arm 24a, 24b includes a proximal end and a distal end. The proximal end of the pivoting arm 24a, 24b extends laterally from the arm shaft 26. The first channel 21a aligns with the second channel 21b. The plurality of radially spaced teeth 28 of the arm shaft 26 interlock with the plurality of radially spaced teeth 22 of the body shaft 20.

The present invention further includes an arm screw 36. The arm screw 36 includes a knob 36a and a shaft 36b. The shaft 36b includes a proximal end extending from the knob 36a and a distal end having a male threaded portion. The shaft 36b runs through the first channel 21a and the second channel 21b. The male threaded portion mechanically fastens to the threaded insert 32 of the bottom portion of the arm shaft 26. A clip 40 releasably secures to the distal end of the shaft of the arm screw 26.

A method of clearing wires may include the steps of: clamping a first wire clearance apparatus 10a to a first side flange 44a of a panel housing 42, wherein the first wire clearance apparatus 10a includes a first pivoting arm 24a having a first hook portion 25d; clamping a second wire clearance apparatus 10b to a second side flange 44b of the panel housing 42 opposite the first side flange 44a, wherein the second wire clearance apparatus 10b includes a second pivoting arm 24b having a second hook portion 25e; placing a first set of wires 46a into the first hook portion 25d; placing a second set of wires 46b into the second hook portion 25e; rotating the first pivoting arm 24a away from the panel housing 42, thereby clearing the first set of wires 46a from an internal portion of the panel housing 42; and rotating the second pivoting arm 24b away from the panel housing 42, thereby clearing the second set of wires 46b from the internal portion of the panel housing 42. The wire clearance apparatuses 10a, 10b may be placed approximately eight inches up to twelve inches from the top of the panel housing 42.

The steps of clamping the first and second wire clearance apparatuses 10a, 10b may include the following steps: placing the first side flange 44a within one of the slots 13a, 13b of the first wire clearance apparatus 10a; rotating the knobs of the thumb screws 34 clockwise until pressure is being applied from the shafts to the flange 44; placing the second side flange 44b within one of the slots 13a, 13b of the second wire clearance apparatus 10b; and rotating the knobs of the thumb screws 34 clockwise until pressure is being applied from the shafts to the flange 44. The steps of rotating the first pivoting arm 24a and the second pivoting arm 24b may further include the following steps: unscrewing the arm screw 36 by rotating the knob 36a of the arm screw 36 counter clockwise to separate the interlocking teeth 22, 28; rotating the arm shaft 26 relative to the body shaft 20; and screwing the arm screw 36 back by rotating the knob 36a of the arm screw 36 clockwise, thereby clamping the arm shaft 26 and the body shaft 20 together and interlocking the teeth 22, 28.

The parts of the present invention may be made with plastic or composite material (non-conductive). The threaded inserts and threaded grommets may be brass and are embedded in the clamp. The pivoting member may be a bar shaped metal, plastic or other composite material that is strong enough to support branch circuit wires or telecommunication wires. The pivoting member is bent in a shape to restrain wires from moving back to the center and work area.

It should be understood, of course, that the foregoing relates to exemplary embodiments of the invention and that modifications may be made without departing from the spirit and scope of the invention as set forth in the following claims.

What is claimed is:

1. A method of clearing wires comprising steps of:
clamping a first wire clearance apparatus to a first side flange of a panel housing, wherein the first wire clearance apparatus comprises a first pivoting arm comprising a first hook portion formed by a bend in a first direction;
clamping a second wire clearance apparatus to a second side flange of the panel housing opposite the first side flange, wherein the second wire clearance apparatus comprises a second pivoting arm comprising a second hook portion formed by a bend in a second direction opposite the first direction, wherein a work area is disposed in between the first side flange and the second side flange;
placing a first set of wires into the first hook portion; placing a second set of wires into the second hook portion; rotating the first pivoting arm in the first direction away from the panel housing, thereby clearing the first set of wires from the working area of the panel housing; and rotating the second pivoting arm in the second direction opposite the first direction away from the panel housing, thereby clearing the second set of wires from the working area of the panel housing;

wherein each of said first and second wiring clearance apparatuses comprises a body including a first vertical slot with a first clamping mechanism and a second vertical slot positioned angularly to said first vertical slot, said second vertical slot having a second clamping mechanism, the second vertical slot being connected to a body shaft housing an arm screw, wherein the body shaft is connected to corresponding one of said first hook portion or said second hook portion.

2. The method of claim 1, wherein each of the first wire clearance apparatus and the second wire clearance apparatus comprises a clamp comprising a pair of panels vertically disposed and forming one of the first or second vertical slots therebetween, wherein the first side flange is disposed within the one of the first or second vertical slots of the first wire clearance apparatus and the second side flange is disposed within the one of the first or second vertical slots of the second wire clearance apparatus.

3. The method of claim 2, wherein the clamps each comprise a threaded female opening formed through at least one of the pair of panels; and each of said first and second clamping mechanisms being a thumb screw comprising a threaded shaft rotatably disposed within the at least one threaded female opening.

4. The method of claim 3, wherein the steps of clamping the first wire clearance apparatus and the second wire clearance apparatus comprise:

placing the first side flange within the slot of the first wire clearance apparatus;

rotating the knob of the thumb screw of the first wire clearance apparatus clockwise until pressure is applied against the first side flange;

placing the second side flange within the slot of the second wire clearance apparatus; and rotating the knob of the thumb screw of the second wire clearance apparatus clockwise until pressure is applied against the second side flange.

\* \* \* \* \*